(12) United States Patent
Lerman et al.

(10) Patent No.: US 9,712,512 B2
(45) Date of Patent: Jul. 18, 2017

(54) SECURE CONTENT MESSAGING

(71) Applicant: Confide Inc., New York, NY (US)

(72) Inventors: Howard Lerman, New York, NY (US); Tom Dixon, New York, NY (US); Rob Figueiredo, New York, NY (US); Rich Hong, New York, NY (US); Jeffrey Grossman, New York, NY (US)

(73) Assignee: Confide Inc., New York, NY (US)

( * ) Notice: Subject to any disclaimer, the term of this patent is extended or adjusted under 35 U.S.C. 154(b) by 0 days.

(21) Appl. No.: 15/015,108

(22) Filed: Feb. 3, 2016

(65) Prior Publication Data

US 2016/0164854 A1 Jun. 9, 2016

Related U.S. Application Data

(63) Continuation-in-part of application No. 14/489,309, filed on Sep. 17, 2014.

(60) Provisional application No. 62/111,650, filed on Feb. 3, 2015, provisional application No. 61/879,001, filed on Sep. 17, 2013, provisional application No. 61/934,321, filed on Jan. 31, 2014.

(51) Int. Cl.
*G06F 21/00* (2013.01)
*H04L 29/06* (2006.01)
*G06F 21/62* (2013.01)
*G06F 17/30* (2006.01)
*H04L 12/58* (2006.01)

(52) U.S. Cl.
CPC ........ *H04L 63/08* (2013.01); *G06F 17/30914* (2013.01); *G06F 21/6209* (2013.01); *H04L 51/063* (2013.01); *H04L 51/066* (2013.01); *H04L 51/12* (2013.01)

(58) Field of Classification Search
CPC ......... H04L 63/08; H04L 63/20; H04L 51/12; H04L 51/08
USPC ............................................................ 726/4
See application file for complete search history.

(56) References Cited

U.S. PATENT DOCUMENTS

| | | | |
|---|---|---|---|
| 8,954,605 B1 | 2/2015 | Hecht | |
| 2006/0161971 A1* | 7/2006 | Bleahen | G06F 21/606 726/4 |
| 2008/0226136 A1 | 9/2008 | Takaku et al. | |
| 2009/0249077 A1 | 10/2009 | Gargaro et al. | |
| 2012/0210126 A1* | 8/2012 | Johnson | G06F 17/30 713/165 |

(Continued)

*Primary Examiner* — Syed Zaidi
(74) *Attorney, Agent, or Firm* — Lowenstein Sandler LLP

(57) ABSTRACT

Systems and methods are disclosed for secure messaging and content sharing. In one implementation, a processor receives a content item in a first format, the content item being associated with an intended recipient, converts the content item into a second format, provides the content item, as converted into the second format, to a device associated with the intended recipient, receives, from the device associated with the intended recipient, one or more inputs in relation to a segment of the content item, processes the one or more inputs to determine that an authentication action is being performed with respect to the segment of the content item, and based on a determination that the authentication action is being performed with respect to the segment of the content item, provides an instruction to present the segment of the content item at the device associated with the intended recipient.

20 Claims, 15 Drawing Sheets

(56) References Cited

U.S. PATENT DOCUMENTS

2015/0205975 A1\* 7/2015 Agrawal ................. G06F 21/51
713/189

\* cited by examiner

Jeff Test

Howard Lerman

Rich Hong

SECURE CONTENT MESSAGING

CROSS-REFERENCE TO RELATED APPLICATIONS

This application claims the benefit of U.S. Patent Application No. 62/111,650, filed Feb. 3, 2015 and is also a continuation-in-part of U.S. patent application Ser. No. 14/489,309, filed Sep. 17, 2014 which claims the benefit of U.S. Patent Application No. 61/879,001, filed Sep. 17, 2013, and U.S. Patent Application No. 61/934,321, filed Jan. 31, 2014, each of which is incorporated herein by reference in its respective entirety.

TECHNICAL FIELD

Aspects and implementations of the present disclosure relate to data processing, and more specifically, to secure messaging and content sharing.

BACKGROUND

Electronic messaging services and frameworks, such as email and text messaging, enable users that receive electronic messages to capture and/or forward the contents of such received messages. Accordingly, such services are ill suited for confidential and/or sensitive communications.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives receiving a content item in a first format, the content item being associated with an intended recipient. The processing device converts the content item into a second format. The processing device provides the content item, as converted into the second format, to a device associated with the intended recipient. The processing device receives, from the device associated with the intended recipient, one or more inputs in relation to a segment of the content item. The processing device processes the one or more inputs to determine that an authentication action is being performed with respect to the segment of the content item. Based on a determination that the authentication action is being performed with respect to the segment of the content item, the processing device provides an instruction to present the segment of the content item at the device associated with the intended recipient.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
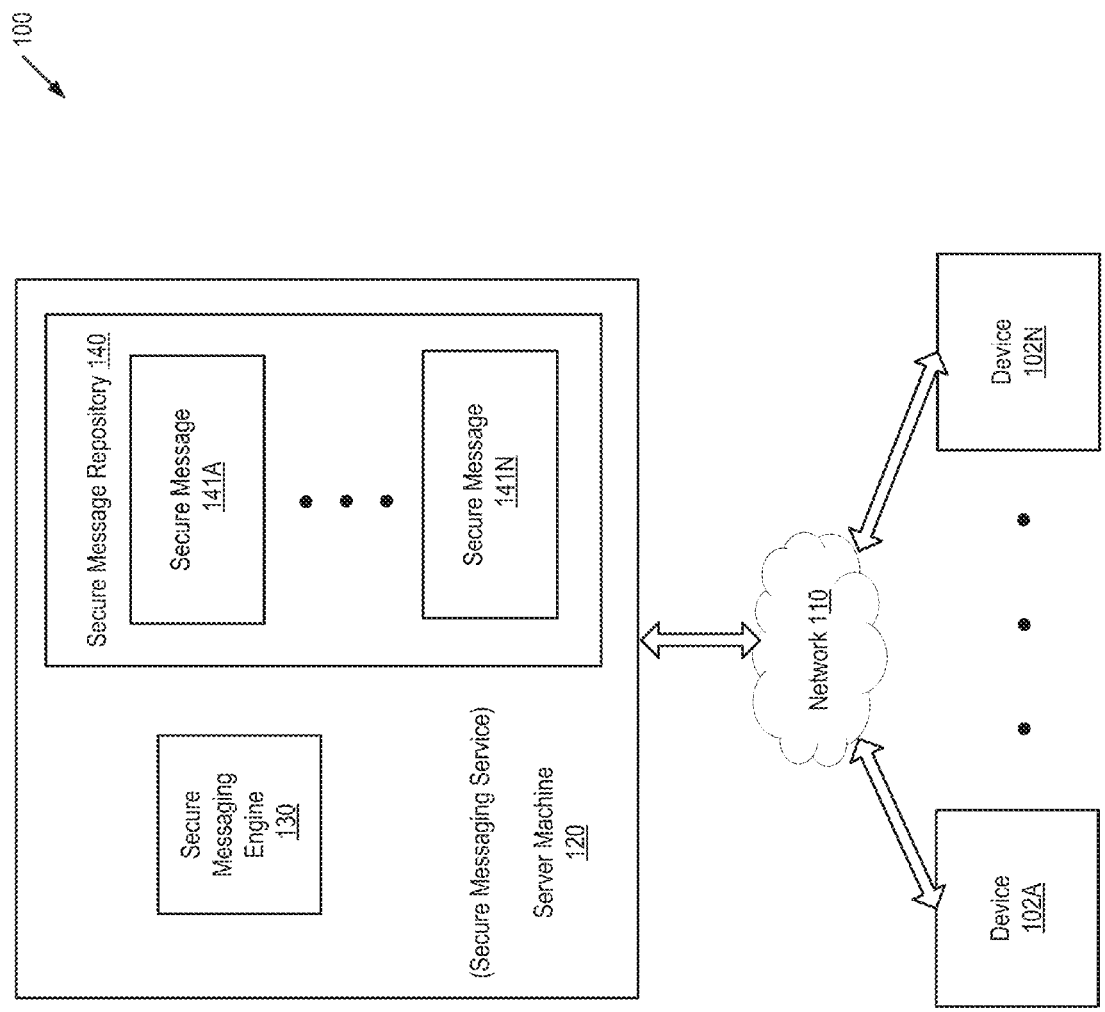
FIG. 1 depicts an illustrative system architecture, in accordance with one implementation of the present disclosure.

Aspects and implementations of the present disclosure are directed to secure messaging and content delivery. The systems and methods disclosed can be applied to various forms of electronic messaging, including but not limited to email, text messaging, instant messaging, multimedia messaging, etc. Additionally, the described technologies can be employed with respect to various types of content and/or media, such as text and/or other files or documents, images, audio, video, etc. More particularly, it can be appreciated that, for a number of reasons, many existing messaging services, frameworks, applications, etc., are ineffective with respect to the exchange of sensitive/confidential communications. For example, the relative ease with which practically any electronic communication (e.g., email, text message, etc.) can be copied, forwarded, or otherwise saved/maintained, results in many users avoiding the use of such technologies when transmitting sensitive information. Alternatively, some users nevertheless utilize existing technologies for the exchange of sensitive communications, often resulting in such communications being disseminated to parties to which their dissemination was not intended and/or desired. It is noted that while existing applications such as 'Snapchat' enable users to share images/videos with one another and, upon being viewed, such images/videos are automatically deleted, the referenced applications are ill suited for business/professional contexts/communications. For example, applications such as Snapchat (which are directed to image/video sharing) do not enable users to conduct secure text correspondence between one another, nor do such applications enable users to send/receive secure messages to/from contacts with whom a preexisting connection/relationship exists (e.g., via a social networking platform).

Accordingly, described herein are technologies that enable users to exchange secure messages (e.g., text, media, etc.) and/or other content with one another. In certain implementations, users can be restricted to sending and/or receiving secure messages/content with others users with whom they have a preexisting connection to/relationship with (as can be determined, for example, based on a social networking contact list). Moreover, while the intended recipient of such a secure message can be notified of receipt of the message, in certain implementations such a user may only be granted access to the content of the message upon satisfactorily performing one or more authentication actions, such as in relation to a device on which the secure message is to be viewed. In doing so, it can be further ensured that the recipient is not capable of copying/forwarding the contents of the secure communication. Additionally, in certain implementations one or more images/videos can be captured concurrent with the viewing of the secure message (e.g., by a camera integrated within the device on which the secure message is being viewed). In doing so, the circumstances/context in which the secure message is viewed can be memorialized, and an attempt by the viewer to capture the content of the secure message using an external device (e.g. an external camera) can be identified/determined based on the images/video.

By way of illustration, the technologies described herein can enable users to send and/or receive secure messages/content, such as messages containing sensitive content that the sender and/or receiver may not wish to be retained (e.g., after it is reviewed by the receiver) and/or disseminated. For example, it may not be advantageous to one and/or both parties to a business transaction/negotiation for a record of various business terms (e.g., specific financial terms, offers, etc.) to be maintained. By way of further example, it may not be advantageous for one or both parties discussing a particular individual (e.g., expressing their frank opinions about the individual) for a record of such communications to be maintained. Accordingly, rather than simply conducting the referenced communications without the use of electronic communication means, the technologies described herein can enable users to send/receive secure messages to one another (e.g., messages containing sensitive/confidential financial terms, potentially objectionable personal opinions, etc.) in a manner that makes the capture/memorialization of such communications considerably more difficult/impossible. Moreover, the disclosed technologies can enable users to send/receive content (e.g., documents, files, media, etc.) while preventing such content from being retained after it has been reviewed.

FIG. 1 depicts an illustrative system architecture 100, in accordance with one implementation of the present disclosure. The system architecture 100 includes user devices 102A-102N and server machine 120. These various elements or components can be connected to one another via network 110, which can be a public network (e.g., the Internet), a private network (e.g., a local area network (LAN) or wide area network (WAN)), or a combination thereof.

User devices 102A-102N can be rackmount servers, router computers, personal computers, portable digital assistants, mobile phones, laptop computers, tablet computers, cameras, video cameras, netbooks, desktop computers, media centers, smartphones, watches, smartwatches, in-vehicle computer/systems, wearable devices, any combination of the above, or any other such computing device capable of implementing the various features described herein. The user devices 102A-102N may run an operating system (OS) that manages hardware and software of the user devices 102A-102N. Various applications, such as mobile applications ('apps'), web browsers, etc. (not shown) may run on the user devices (e.g., on the OS of the user devices). Such applications can, for example, enable a user to create, transmit, and/or receive electronic messages (e.g., emails, text messages, instant messages, multimedia messages, etc.) and/or other content, such as in a manner known to those of ordinary skill in the art. The user devices 102A-102N can be geographically distributed anywhere throughout the world. It should be understood that, in certain implementations, user device(s) 102 can also include and/or incorporate various sensors and/or communications interfaces (including but not limited to those depicted in FIG. 12 and/or described herein). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc.

Figure 12:
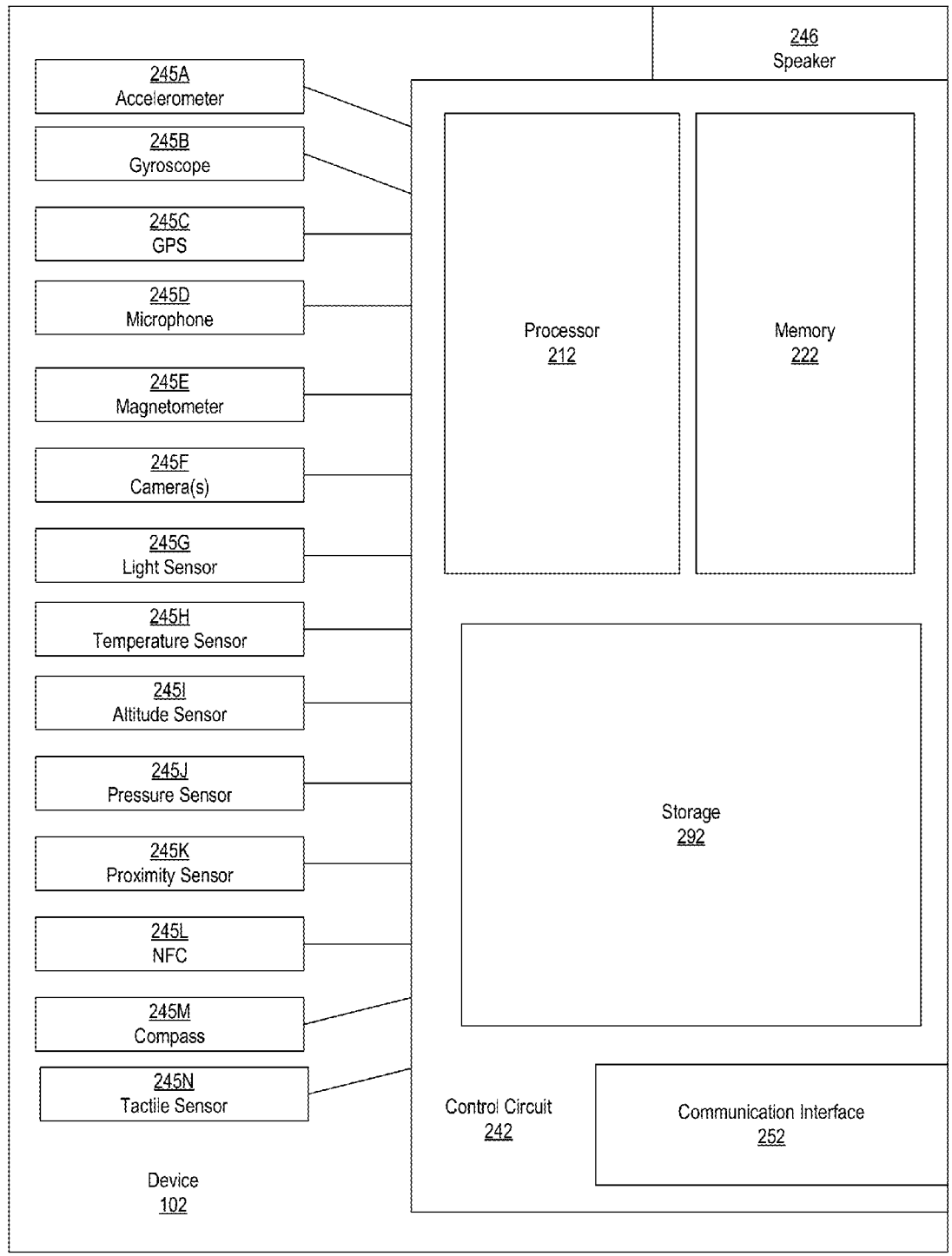
FIG. 12 depicts an exemplary implementation of a device in accordance with aspects and implementations of the present disclosure.

As noted, in certain implementations, user device(s) 102 can also include and/or incorporate various sensors and/or communications interfaces. By way of illustration, FIG. 12 depicts one exemplary implementation of a user device 102. As shown in FIG. 12, device 102 can include a control circuit 242 (e.g., a motherboard) which is operatively connected/coupled to various hardware and/or software components that serve to enable various operations, such as those described herein. Control circuit 242 can be operatively connected to processor 212 and memory 222. Processor 212 serves to execute instructions for software that can be loaded into memory 222. Processor 212 can be a number of processors, a multi-processor core, or some other type of processor, depending on the particular implementation. Further, processor 212 can be implemented using a number of heterogeneous processor systems in which a main processor is present with secondary processors on a single chip. As another illustrative example, processor 212 can be a symmetric multi-processor system containing multiple processors of the same type.

Memory 222 and/or storage 292 may be accessible by processor 212, thereby enabling processor 212 to receive and execute instructions stored on memory 222 and/or on storage 292. Memory 222 can be, for example, a random access memory (RAM) or any other suitable volatile or non-volatile computer readable storage medium. In addition, memory 222 can be fixed or removable. Storage 292 can take various forms, depending on the particular implementation. For example, storage 292 can contain one or more components or devices. For example, storage 292 can be a hard drive, a flash memory, a rewritable optical disk, a rewritable magnetic tape, or some combination of the above. Storage 292 also can be fixed or removable.

A communication interface 252 is also operatively connected to control circuit 242. Communication interface 252 can be any interface (or multiple interfaces) that enables communication between user device 102 and one or more external devices, machines, services, systems, and/or elements (including but not limited to those depicted in FIG. 1 and described herein). Communication interface 252 can include (but is not limited to) a modem, a Network Interface Card (NIC), an integrated network interface, a radio frequency transmitter/receiver (e.g., WiFi, Bluetooth, cellular, NFC), a satellite communication transmitter/receiver, an infrared port, a USB connection, or any other such interfaces for connecting device 102 to other computing devices, systems, services, and/or communication networks such as the Internet. Such connections can include a wired connection or a wireless connection (e.g. 802.11) though it should be understood that communication interface 252 can be practically any interface that enables communication to/from the control circuit 242 and/or the various components described herein.

At various points during the operation of described technologies, device 102 can communicate with one or more other devices, systems, services, servers, etc., such as those depicted in FIG. 1 and/or described herein. Such devices, systems, services, servers, etc., can transmit and/or receive data to/from the user device 102, thereby enhancing the operation of the described technologies, such as is described in detail herein. It should be understood that the referenced devices, systems, services, servers, etc., can be in direct communication with user device 102, indirect communication with user device 102, constant/ongoing communication with user device 102, periodic communication with user device 102, and/or can be communicatively coordinated with user device 102, as described herein.

Also connected to and/or in communication with control circuit 242 of user device 102 are one or more sensors 245A-245N (collectively, sensors 245). Sensors 245 can be various components, devices, and/or receivers that can be incorporated/integrated within and/or in communication with user device 102. Sensors 245 can be configured to detect one or more stimuli, phenomena, or any other such inputs, described herein. Examples of such sensors 245 include, but are not limited to, an accelerometer 245A, a gyroscope 245B, a GPS receiver 245C, a microphone 245D, a magnetometer 245E, a camera 245F, a light sensor 245G, a temperature sensor 245H, an altitude sensor 245I, a pressure sensor 245J, a proximity sensor 245K, a near-field communication (NFC) device 245L, a compass 245M, and a tactile sensor 245N. As described herein, device 102 can perceive/receive various inputs from sensors 245 and such inputs can be used to initiate, enable, and/or enhance various operations and/or aspects thereof, such as is described herein.

At this juncture it should be noted that while the foregoing description (e.g., with respect to sensors 245) has been directed to user device 102, various other devices, systems, servers, services, etc. (such as are depicted in FIG. 1 and/or described herein) can similarly incorporate the components, elements, and/or capabilities described with respect to user device 102. It should also be understood that certain aspects and implementations of various devices, systems, servers, services, etc., such as those depicted in FIG. 1 and/or described herein, are also described in greater detail below in relation to FIG. 10.

Server machine 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Server machine 120 can include components such as secure messaging engine 130, and secure message repository 140. It should be understood that, in certain implementations, server 120 can also include and/or incorporate various sensors and/or communications interfaces (including but not limited to those depicted in FIG. 12 and described in relation to user device 102). The components can be combined together or separated in further components, according to a particular implementation. It should be noted that in some implementations, various components of server machine 120 may run on separate machines. Moreover, some operations of certain of the components are described in more detail below with respect to FIGS. 2-12.

Secure message repository 140 can be hosted by one or more storage devices, such as main memory, magnetic or optical storage based disks, tapes or hard drives, NAS, SAN, and so forth. In some implementations, secure message repository 140 can be a network-attached file server, while in other implementations secure message repository 140 can be some other type of persistent storage such as an object-oriented database, a relational database, and so forth, that may be hosted by the server machine 120 or one or more different machines coupled to the server machine 120 via the network 110, while in yet other implementations secure message repository 140 may be a database that is hosted by another entity and made accessible to server machine 120.

Secure message repository 140 can include secure messages 141A-141N and/or any other such content (e.g., documents, files, media, etc.). For example, in certain implementations, secure messages 141A-141N can correspond to various forms of electronic communication (e.g., emails, text messages, instant messages, multimedia messages, etc.) and can be provided, for example, by one user (e.g., a user of a user device 102). Moreover, in certain implementations, one or more of the secure messages 141 can be associated with one or more recipients (e.g., one or more other users of other user devices) with respect to which such messages are directed and/or intended. Additionally, an authentication action can be associated with one or more of the secure messages. Such an authentication action can include one or more gestures and/or any other such inputs that a recipient of the associated secure message can be prompted to perform or otherwise provide (e.g., with respect to a device 102) in order to gain access to or otherwise be able to view the message. Moreover, in certain implementations, various metadata can be maintained with respect to one or more of the secure messages 141. For example, one or more aspects pertaining to various operations and/or events occurring with respect to a secure message (e.g., the date, time, location, etc., associated with a receipt/viewing of the message, etc.) can be tracked and/or otherwise maintained in relation to the message. It should also be noted that any number of other conditions and/or requirements (e.g., geographic restrictions dictating the geographic area within which the secure message can be viewed, time restrictions dictating the a time limit within which the secure message can be viewed, etc.) can also be dictated by a sender of a secure message 141 and associated with the message.

As described herein, a secure message can originate from a sender and be received (e.g., by server 120) in association with one or more intended recipients. A notification (notifying the intended recipient of receipt of the message) can be provided. Access to the secure message can then be provided or precluded based on a determination as to whether the intended recipient is performing (or has performed) one or more authentication actions. In certain implementations, one or more of such operations can be performed by and/or in conjunction with secure messaging engine 130, as described herein.

It should be understood that though FIG. 1 depicts server 120 and device(s) 102 as being discrete components, in various implementations any number of such components (and/or elements/functions thereof) can be combined, such as within a single component/system. For example, in certain implementations server 120 can incorporate features of a device 102.

Figure 2:
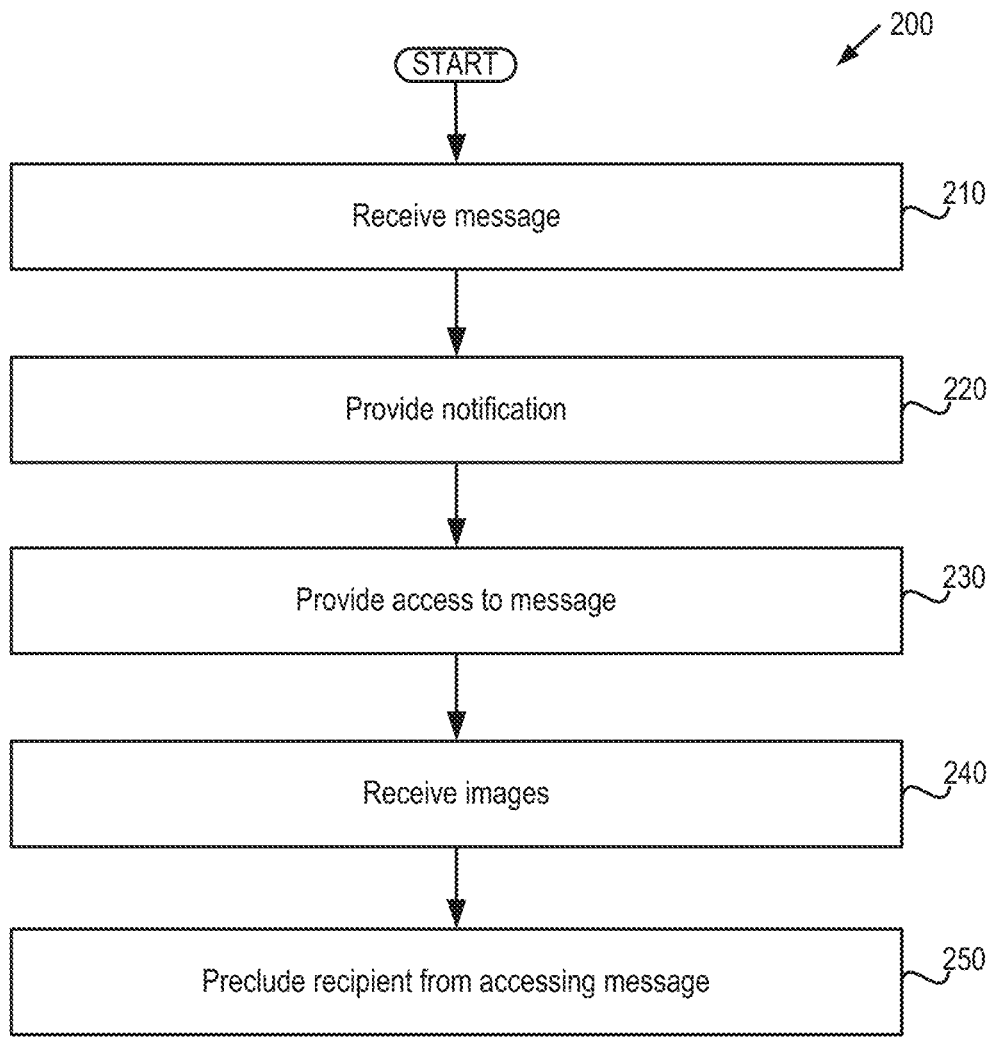
FIG. 2 depicts a flow diagram of aspects of a method for secure messaging and content sharing.

FIG. 2 depicts a flow diagram of aspects of a method 200 for providing secure messaging. The method is performed by processing logic that may comprise hardware (circuitry, dedicated logic, etc.), software (such as is run on a computing device such as those described herein), or a combination of both. In one implementation, the method is performed by server machine 120 of FIG. 1, while in some other implementations one or more blocks of FIG. 2 may be performed by another machine. For example, in various alternative implementations, the method can be performed at a user device 102 (i.e., the method or various aspects thereof can be performed locally at device 102 rather than at/in communication with a server such as server machine 120).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210, a message can be received. In certain implementations, such a message can be received from a user (e.g., a sender), such as via a user device. Moreover, in certain implementations the message can be associated with an intended recipient, such as one or more users to whom the sender wishes, intends, and/or otherwise indicates for the message to be transmitted or otherwise provided. In one aspect, block 210 is performed by secure messaging engine 130.

Figure 3A:
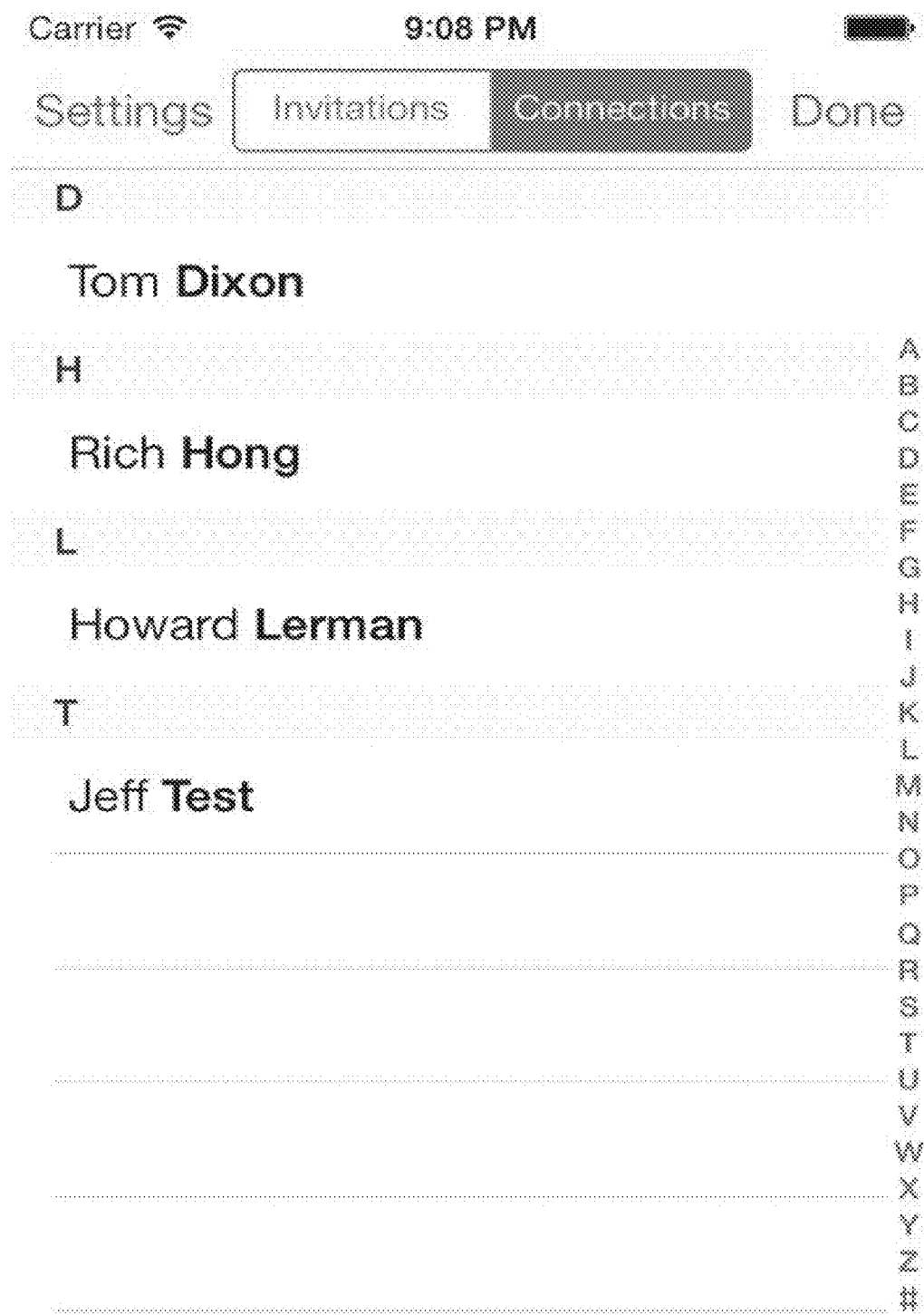
FIG. 3A depicts an exemplary interface reflecting various aspects described herein, in accordance with one implementation of the present disclosure.

In certain implementations, the technologies described herein can be configured to enable secure communication substantially between users who have a preexisting or preestablished relationship with one another (e.g., users that are connected to one another through a social network). For example, FIG. 3A depicts an exemplary screenshot of a user interface that can be utilized by a sender (e.g., via device 102) to select one or more existing connections/contacts as a recipient of a secure message.

At block 220, a notification pertaining to the message can be provided. In certain implementations, such a notification can be provided to the intended recipient. Such a notification can be, for example, an email, text message, or any other such electronic communication (including those communications that may be unsecured or relatively less secure). Such a notification can inform the recipient that a secure message intended for the recipient has been provided by the sender (while not providing further details pertaining to the content/substance of the message, for example). In one aspect, block 220 is performed by secure messaging engine 130.

Figure 3B:
FIG. 3B depicts an exemplary interface reflecting various aspects described herein, in accordance with one implementation of the present disclosure.
Figure 3B:
Figure 3B:
Figure 3B:
Figure 3B:
Figure 3B:
Figure 3B:
Figure 3B:

FIG. 3B depicts an exemplary screenshot of a user interface that can be presented to a recipient (e.g., via device 102) to notify the recipient of receipt of a secure message. As shown in FIG. 3B a circular icon (or any other such icon or indicator) can be provided adjacent to the name of the contact from which a secure message has been received, indicating to the recipient that an unread secure message is awaiting viewing by the recipient.

At block 230, access to the message can be provided to the intended recipient. In certain implementations, such access can be provided based on a determination that the intended recipient is performing/has performed one or more authentication actions. That is, in addition to providing notification of the transmission of the message (such as at block 220), the user can also be prompted or otherwise notified of one or more authentication actions that the recipient is to perform or otherwise input in order to gain access to the content of the secure message itself. By way of illustration, such authentication actions can include one or more gestures or other such inputs that a user can be required to input (e.g., to a device 102) in order to gain access to the secure message(s). For example, in order to gain access to a secure message, a user can be required to provide and/or maintain one or more inputs (e.g., tactile inputs) with respect to a touchscreen interface of a device 102 (e.g., in one or more regions of a touchscreen). Upon determining that such authentication action(s) have been (e.g., within the last five seconds) and/or are currently being provided by the user, the content of the secure message can be provided (e.g., presented) to the user. In doing so, the content of the secure message can be provided to the recipient concurrent with a determination that the user is providing the referenced authentication action(s), thereby providing the recipient with the ability to view the received secure message(s) while also increasing the likelihood that the user cannot otherwise capture or memorialize a copy of the message(s) (by virtue of requiring the ongoing input in satisfaction of the associated authentication action(s)). In one aspect, block 230 is performed by secure messaging engine 130.

Figure 7:
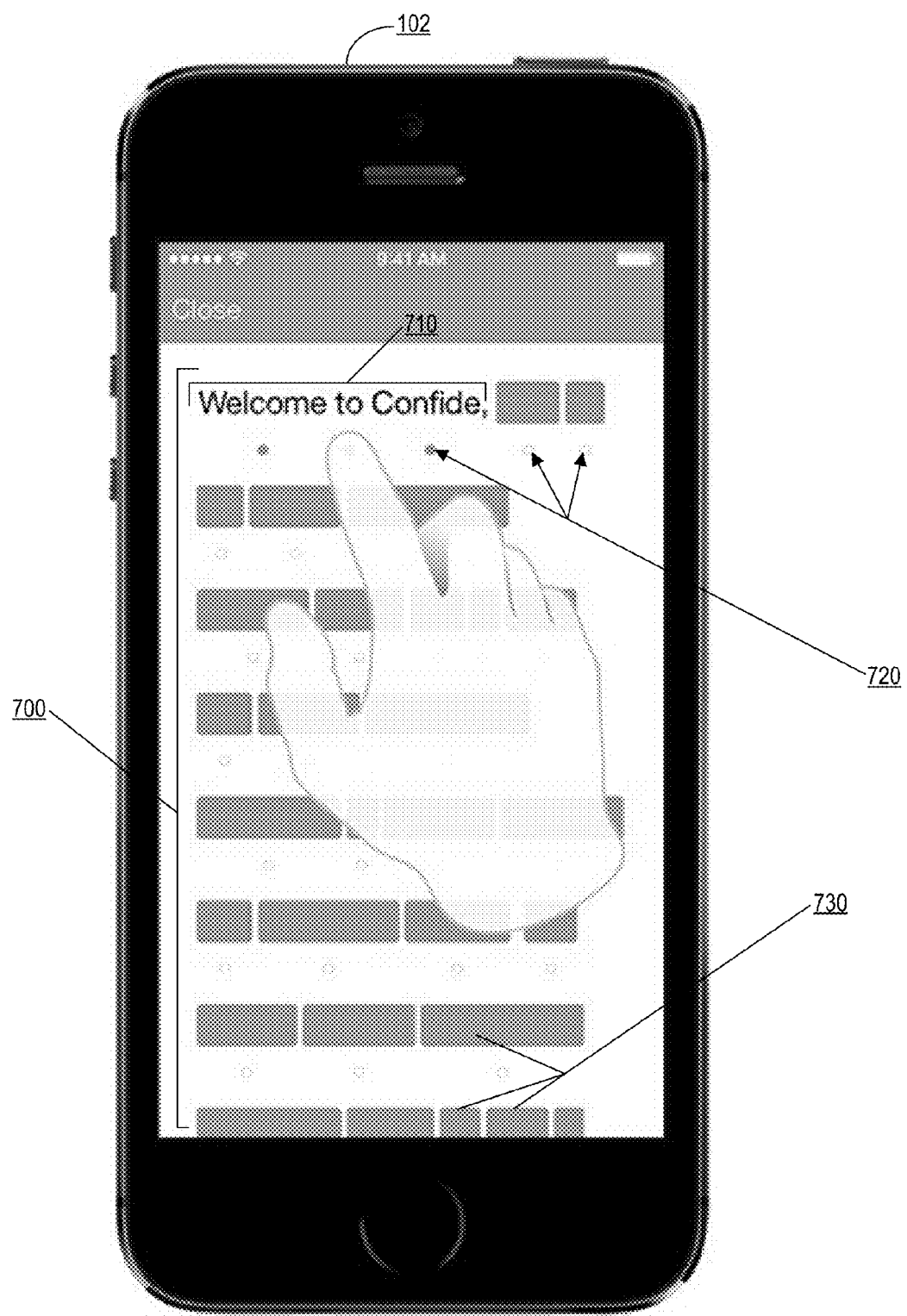
FIG. 7 depicts an exemplary interface reflecting various aspects described herein, in accordance with one implementation of the present disclosure.

By way of illustration, FIG. 7 depicts an exemplary screenshot of a user interface that can be presented to a recipient (e.g., via device 102), depicting a secure message 700. As depicted in FIG. 7 and described herein, such a secure message can be provided/presented to a user (e.g., via device 102) in a manner that obstructs, obscures and/or otherwise conceals the content of the message (e.g., each word, clause, sentence, etc., within the message). For example, each word, clause, etc., within secure message 700 can be obscured and/or otherwise concealed with a concealed content indicator 730, such as is depicted in FIG. 7. Such a concealed content indicator can reflect various aspects of the secure message 700 itself (e.g., the number of words, clauses, etc., within the message) without revealing the underlying content of the message (e.g., the text itself).

It should be understood that while, in certain implementations, an entire message, document, etc., can be secured, in other implementations only a part/segment of such a message/content may be secured, while the remainder may be unsecured. For example, in a scenario in which a user wishes to send a message or document which only contains some amount of sensitive information (and the remainder of which is not sensitive), the technologies described herein can be utilized to identify the sensitive information (e.g., the words, sentences, paragraphs, etc.), and such content can be concealed (and revealed) in the manner described herein. The remainder of the message, content, etc. (e.g., that which is not sensitive) can otherwise be provided to the receiver without necessitating the performance of the described authentication action, etc., and such unsecure content can be retained, memorialized, etc. It should be understood that in other implementations such a framework can be reversed, whereby an entire message can be designated as secured, while a segment or portion thereof can be selected/identified as unsecured.

As noted, in certain implementations, in order to gain access to and/or otherwise reveal the content of a secure message, a user can be prompted and/or required to provide one or more authentication actions (e.g., to provide one or more gestures and/or other such inputs, such as via device 102). By way of illustration, as depicted in FIG. 7, one or more authentication indicators 720 can be provided in conjunction with secure message 700, such that each authentication indicator 720 corresponds to a respective concealed content indicator 730 (which, as noted, obscures a particular word, clause, etc., within the message 700). In certain implementations, each authentication indicator 720 can be oriented/arranged below the respective concealed content indicator 730 to which it corresponds. Authentication indicators 720 can be configured to reveal the content obscured by the concealed content indicator 730 to which they correspond, such as when a tactile input (e.g., a 'tap,' 'click,' 'swipe,' etc.) is determined to have been received in relation to the content indicator (e.g., via a touchscreen interface of device 102). For example, upon determining that an input has been received (and/or continues to be received) in relation to a particular authentication indicator 720 (e.g., at device 102) the corresponding concealed content indicator 730 can be removed, thereby revealing the underlying content (e.g., content segment 710, "Welcome to Confide," as shown in FIG. 7). Moreover, upon determining that such an input is no longer present with respect to a particular authentication indicator 720 (e.g., on account of the user stopping to provide an input with respect to the authentication indicator), the corresponding concealed content indicator 730 can be returned, thereby re-concealing the revealed content segment (e.g., content segment 710). In doing so, the user can, for example, 'swipe' or otherwise pass his/her finger across the various authentication indicators 720 (e.g., from left to right, or in another direction, such as with respect to other languages that are read from right to left, from top to bottom, etc.), and, in doing so, sequentially reveal each word, clause, etc., within a secure message (such as is depicted in FIG. 7). Upon passing a particular authentication indicator 720, the corresponding concealed content indicator 730 can be replaced, thereby re-concealing the revealed segment. In this manner, the user can read the secured message word-by-word, while also ensuring that the entirety of the text/content of the message is not revealed to the user at once, thereby preventing unauthorized memorialization/duplication of the content of the secure message.

In certain implementations, secure message 700 and/or an application/viewer through which such a message is accessed can be configured to require that the content of the message be revealed in a particular sequence. In such a scenario, a user may be required to sequentially reveal the content of the message (e.g., word-by-word, such as in the manner described herein), and may be precluded from revealing words, content, etc., out of sequence. It should also be understood that, in certain implementations, the sender of the secure message may dictate such restriction(s).

Moreover, in certain implementations the described authentication actions can be utilized to initiate the retrieval of particular content segments from a remote device/location, such as from secure message repository 140 of server 120. For example, the content of a secure message can be retained at server 120, and a representation of such content (e.g., concealed content indicators 730 corresponding to the words, clauses, etc., within the message) can be provided to the user (e.g., as depicted in FIG. 7). By way of illustration, initially (e.g., upon notification of receipt of a secure message) only the number of words/clauses in a message, for example, may be transmitted to the recipient (while the actual content of the message itself is not transmitted). Upon determining that an input has been received in relation to an authentication indicator 720 (e.g., at device 102), the content segment that underlies the corresponding concealed content indicator 730 (e.g., content segment 710) can be requested and/or received from server 120 (and presented at the device). In doing so, the message can be further secured by retaining the message content at the server and providing respective content segments to the recipient only in response to the providing of the requisite authentication action with respect to the particular content segment. Moreover, upon determining that the content segment (e.g., a particular word/clause) has been transmitted successfully to the recipient, such a content segment can be deleted from the server.

It should also be noted that while device 102 may be illustrated in various implementations as a mobile device (e.g., a smartphone), in other implementations device 102 can be practically any other device capable of providing the features described herein (e.g., desktop/laptop computer, tablet, etc.). It should also be understood that various aspects of the functionality described herein may be adjusted and/or configured with respect to the particular device. For example, in lieu of providing the referenced authentication action(s) via a touchscreen interface (such as with respect to a smartphone device), in a desktop computer such authentication action(s) can be provided, for example, by passing or hovering a cursor over respective authentication indicators (e.g., via a mouse, keyboard, etc.). It should also be understood that the various techniques described herein can be adjusted and/or configured for messages provided in any language (including languages that may be read from right to left, top to bottom, etc.). Additionally, while in various implementations the secured messages described herein are illustrated with respect to messages that include/incorporate text (e.g., content segment 710), it should be understood that such messages can also incorporate various other media/content items (and/or may constitute media/content items alone) such as documents, images, videos, audio, etc. Such media/content can be obscured in a substantially comparable manner to that described herein, and can be selectively revealed based on a determination that a requisite authentication action has been provided, as also described herein. By way of illustration, a user receiving a secure message containing one or more attached images (which are thereby also obscured) can provide an authentication action (e.g., with respect to an authentication indicator 720 corresponding to a particular image) in order to (temporarily) remove the corresponding concealed content indicator 730 and reveal the underlying image.

Figure 11A:
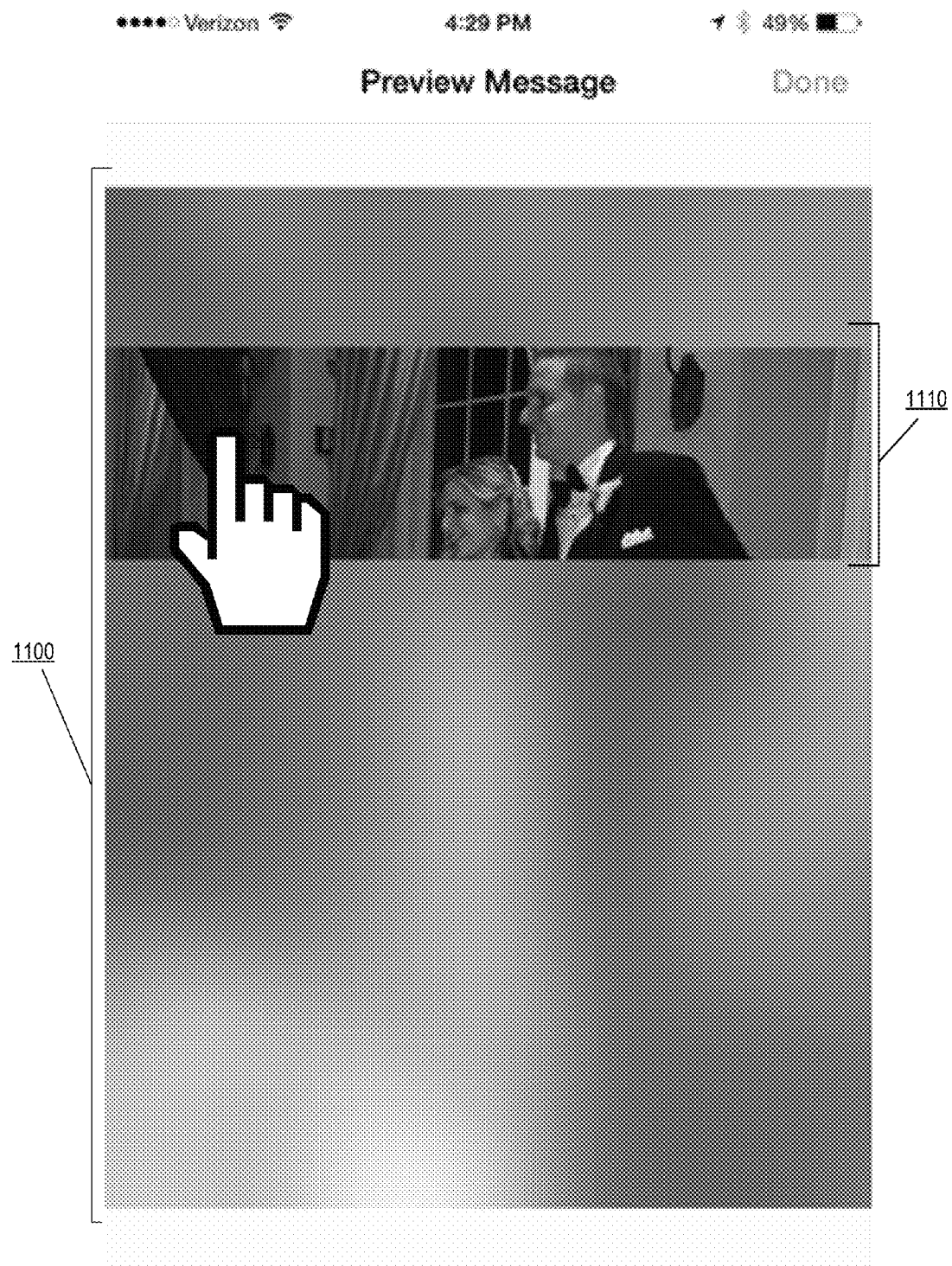
FIG. 11A depicts an exemplary interface reflecting various aspects described herein, in accordance with one implementation of the present disclosure.
Figure 11B:
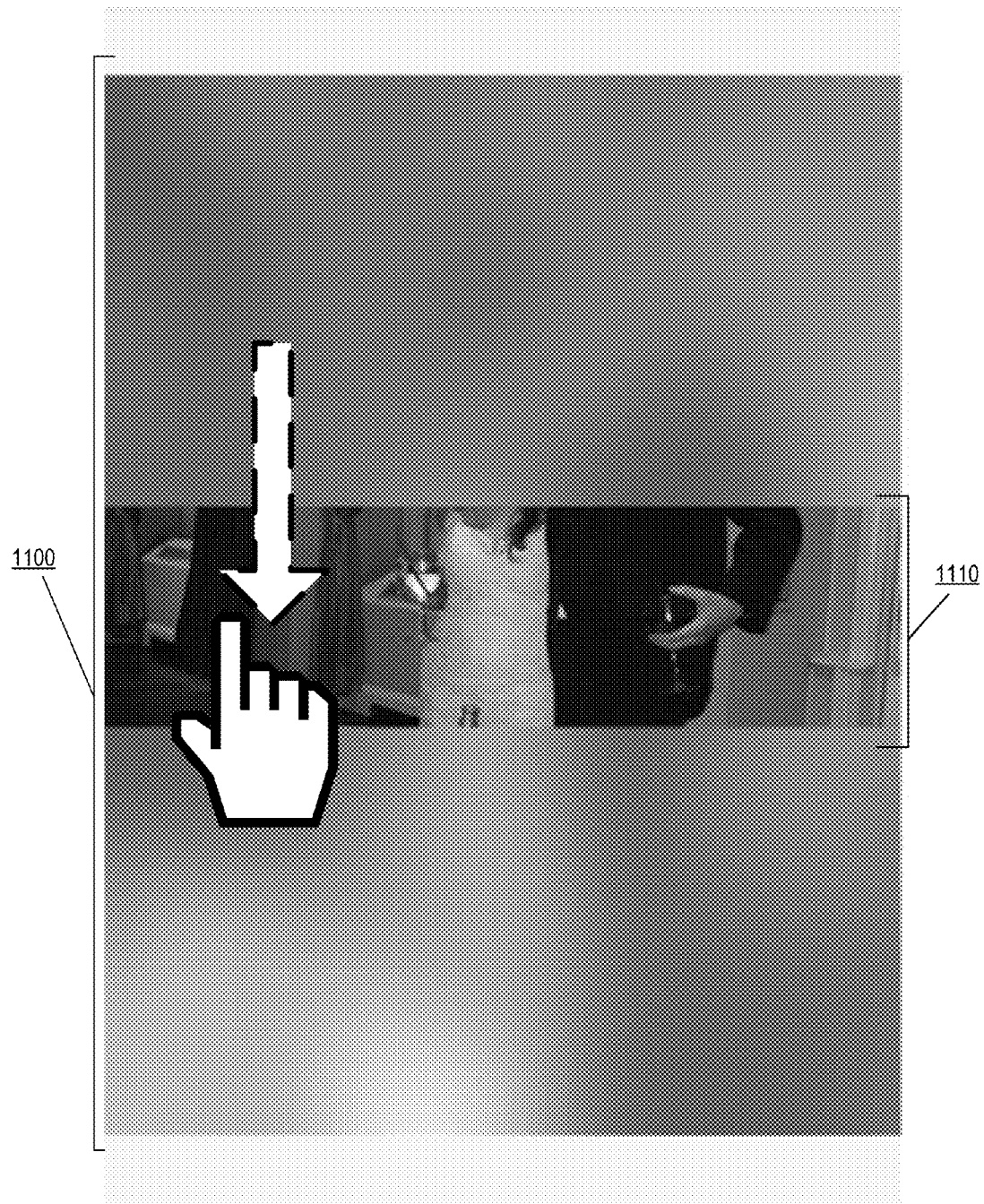
FIG. 11B depicts an exemplary interface reflecting various aspects described herein, in accordance with one implementation of the present disclosure.

Moreover, in certain implementations other types of authentication actions can be used to reveal obscured/secured messages/content (and/or segments thereof). For example, FIGS. 11A-11B depict an exemplary interface in which an image 1100 has been received via a secure messaging communication application/platform, such as is described herein. As shown in FIG. 11A, the image can be obscured (e.g., blurred, redacted, etc.) and, upon performance of an authentication action (e.g., the user placing his/her finger on a region of a touchscreen on which the image is displayed), a portion or segment of the image 1110 can be revealed. Thus, when an input is received in a particular region of the touchscreen (e.g., region 1110 as shown in FIG. 11A), that region (e.g., a segment or portion of the entire image 1100) can be revealed, while the remainder remains obscured. As the user traces his/her finger down the touchscreen, other corresponding segments of the image can be revealed (and those segments that were previously revealed can be re-obscured), such as is depicted in FIG. 11B. In doing so, the user can view the entire image (by tracing his/her finger up/down the touchscreen on which the image is being displayed) in a segment-by-segment fashion (thereby precluding the entire image from being displayed simultaneously on the display).

It should be understood that the described authentication actions (e.g., tracing across an image presented on a touchscreen in order to reveal horizontal segments of the image) are not limited to the presentation of secured image/media content, but can also be used with respect to other content types/messages, such as text-based messages (e.g., SMS messages, emails, and/or any other such form of text-centric communication). For example, a received secured/obscured message can be presented to a user on a touchscreen interface (e.g., with all content/text initially obscured, such as in a manner described herein) and the user can perform an authentication action through which one or more horizontal lines of content/text can be revealed, substantially in the manner described herein with respect to FIGS. 11A-B. As the user traces his/her finger up or down the touchscreen, corresponding lines of the message/text can be revealed (and those lines that were previously revealed can be re-obscured). In doing so, the user can view the entire message (by tracing his/her finger up/down the touchscreen on which the message is displayed) in a line-by-line fashion (thereby precluding the entire message from being displayed simultaneously on the display).

It should also be noted that while the forgoing examples have described authentication actions in which horizontal segments of content are revealed when the user moves his/her finger up/down along a touchscreen (such as in the manner depicted in FIGS. 11A-B) it should be understood that any number of other techniques are also contemplated. Thus, in certain implementations, a vertical segment of content can be revealed as the user moves his/her finger right/left along a touchscreen.

Upon revealing each of the content segments within a secure message (such as in a manner described herein), the secure message can be deleted and/or otherwise restricted from further/subsequent retrieval. In certain implementations, the deletion of such a message can be depicted by showing the various concealed content indicators 730 (which obscured the various content segments within the message) falling away or otherwise disappearing from view, such as in a manner depicted in FIG. 8.

Figure 4:
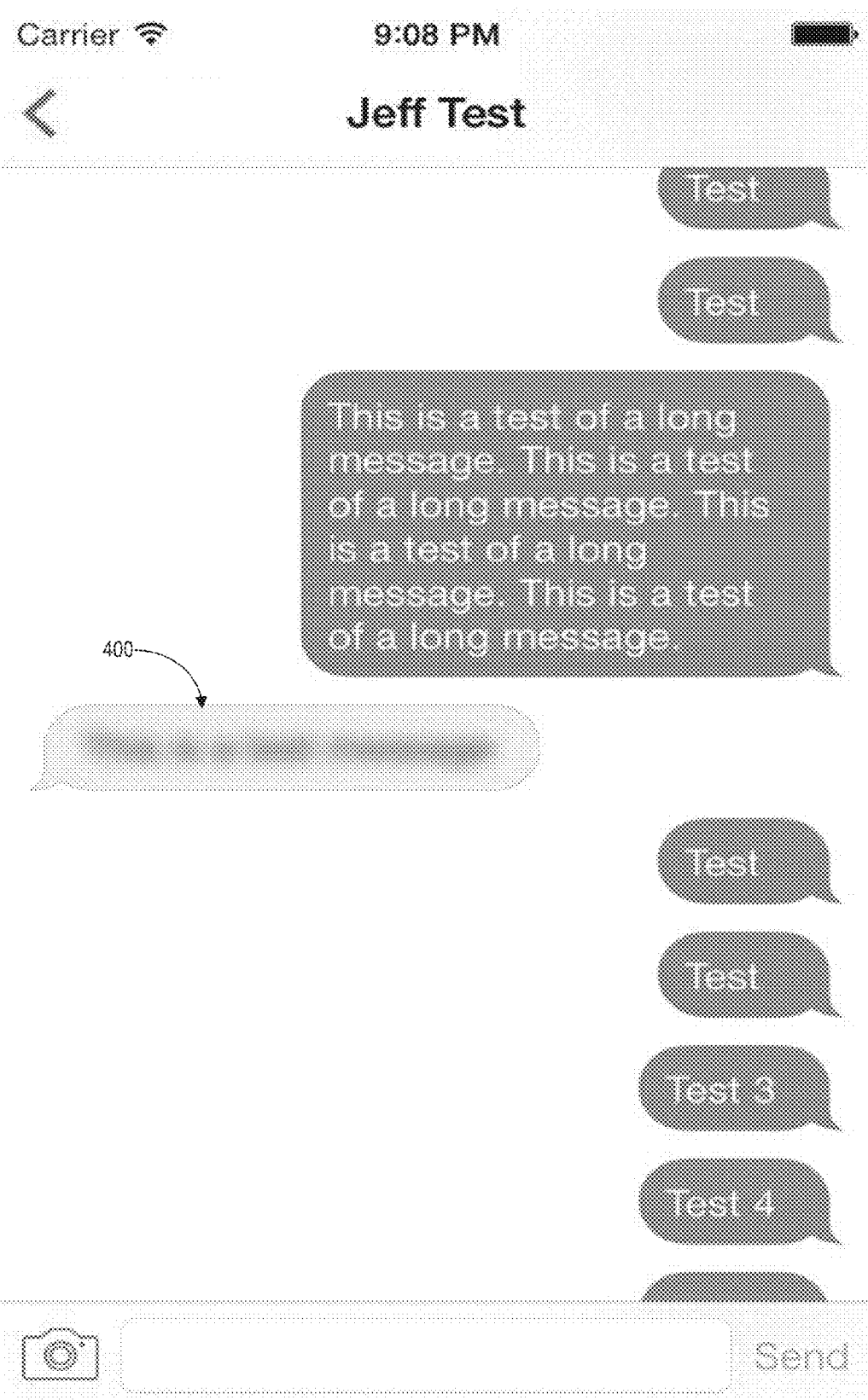
FIG. 4 depicts an exemplary interface reflecting various aspects described herein, in accordance with one implementation of the present disclosure.

FIG. 4 depicts an exemplary screenshot of a user interface that can be presented to a recipient (e.g., via device 102), depicting a secure message 400 provided within the context of a larger messaging exchange or 'conversation,' the remainder of which is unsecured. It can be appreciated with reference to FIG. 4 that while secure message 400 is obscured or otherwise redacted, upon determining that the referenced authentication actions have been provided, the contents of the secure message can be presented or otherwise provided, as described herein.

Figure 5:
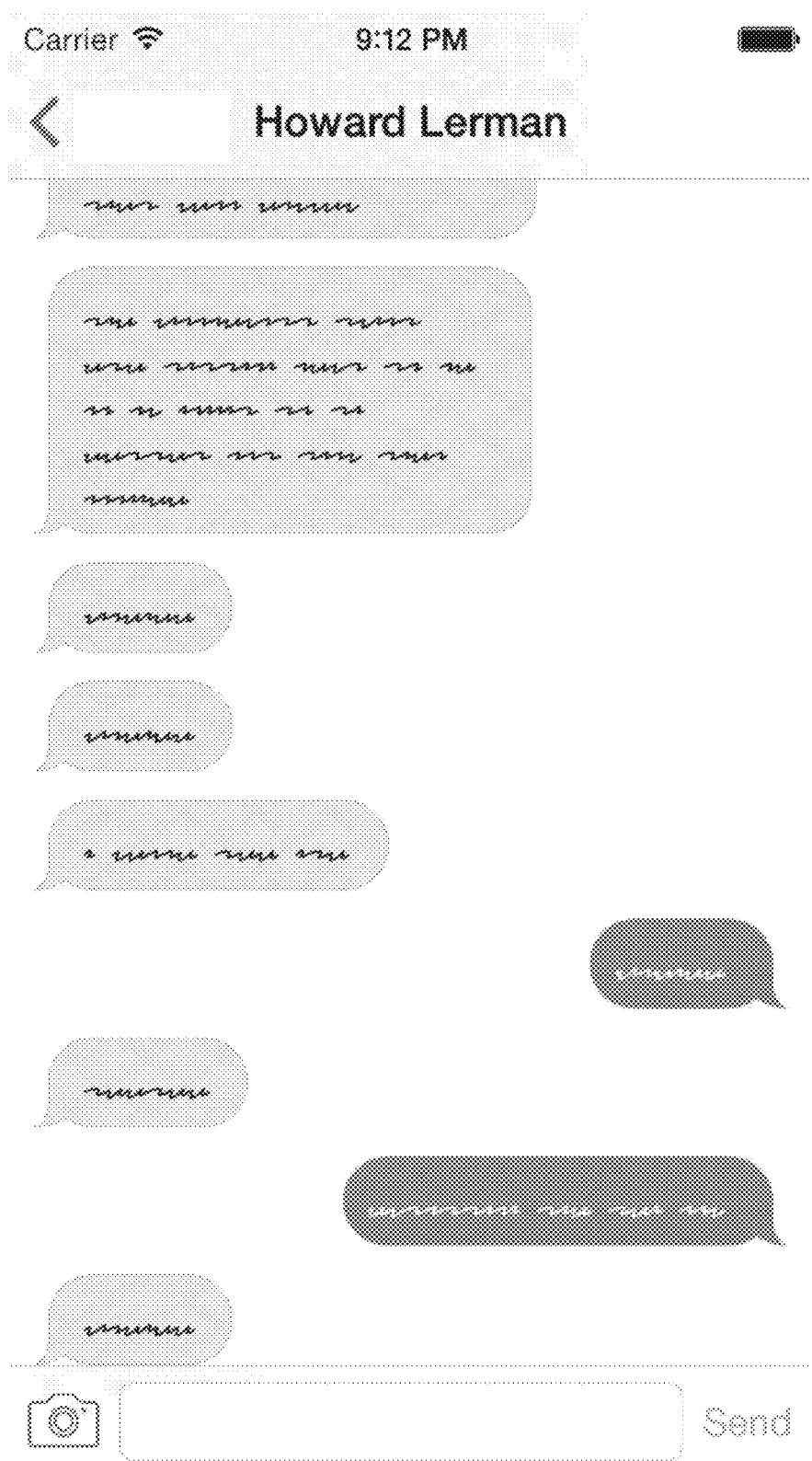
FIG. 5 depicts an exemplary interface reflecting various aspects described herein, in accordance with one implementation of the present disclosure.

In other implementations, substantially all of the messages/correspondence within a messaging exchange or 'conversation,' can be secured as described herein. For example, FIG. 5 depicts an exemplary screenshot of a user interface that can be presented to a recipient (e.g., via device 102), depicting a conversation the entirety of which is secured. It can be appreciated with reference to FIG. 5 that, in certain implementations, the viewing of the content of any of the messages within the conversation can occur substantially only based on a determination that the referenced authentication action(s) have been provided, as described herein.

It should be noted that, in certain implementations, the length of time and/or number of instances that a particular secure message is provided (e.g., presented to the recipient) can be defined and/or limited based on any number of factors. For example, with respect to a secure message containing text, the time duration that such a message is presented (e.g., upon determining that an authentication action has been provided) can be dictated based on the number of characters and/or words in the message (for example, that the message is to be displayed for two seconds for every five words in the message). By way of further example, with respect to a secure message containing playable media (e.g., a video), the number of instances that such a message can be presented (e.g., upon determining that an authentication action has been provided) can be limited (for example, the message/media can only be viewed by the recipient a single time). Additionally, in certain implementations, the sender may impose other types of time limits with respect to a message. For example, the sender can dictate that a particular message may be readable only within a defined time period (e.g., within three hours of the time that it was send, within two hours of the time that it was received, etc.), after which the message is deleted.

At block 240, one or more images can be received. In certain implementations, such images can be captured while the intended recipient is provided with access to the message. That is, in addition to requiring that the recipient perform one or more authentication actions in order to view the secure message(s) (as described at block 230), while such messages are being presented to the recipient the device on which the user is viewing such messages can be configured/directed to capture one or more one or more images, videos, etc., such as using an integrated front-facing camera of the device (i.e., a camera facing the same direction as the display screen of the device that is presenting the secure message). In doing so, one or more images/videos that depict a substantial portion of the field of view of the display (on which the secure message(s) are displayed) can be captured and maintained in association with the secure message(s). Such captured image(s)/video(s) can depict whether a user is utilizing an external device (e.g., another camera) in attempt to capture a copy of the contents of the secure message. Additionally, in certain implementation such captured image(s)/videos can be processed (e.g., using various image processing techniques) to identify/determine the identity of the user that viewed the secure message/content. In one aspect, block 240 is performed by secure messaging engine 130.

At block 250, the intended recipient can be precluded from accessing the message. In certain implementations, such access can be precluded based on a determination that the intended recipient is not performing one or more authentication actions. For example, in a scenario where the recipient is notified (such as at block 220) that a secure message has been received, if such a user does not satisfactorily perform the required authentication action(s), the recipient will be precluded from accessing or otherwise viewing the secure message. By way of further example, in a scenario where the recipient is notified (such as at block 220) that a secure message has been received and satisfactorily performs the required authentication actions, while the user will be provided with access to the secure message, upon ceasing to perform the authentication action(s) the recipient will again be precluded from accessing or otherwise viewing the secure message (unless and until the recipient performs such authentication action(s) again). In one aspect, block 250 is performed by secure messaging engine 130.

It should be noted that in various implementations, the content of the referenced secure message(s) 141 can be maintained at server 120, and such content can be provided to device(s) 102 (e.g., for viewing by a recipient) substantially only upon determination that an authentication action has been satisfactorily performed, as described herein. Accordingly, even in a scenario where a recipient has viewed a received secure message, upon determining (e.g., at block 250) that the authentication action(s) are no longer being performed, any record of the secure content can be deleted or otherwise removed from the viewing device. Stated differently, determining that the referenced authentication action(s) have been satisfactorily performed can provide the recipient with temporary access to view the secure message as stored at server 120, however at no point does the user device 102 actually maintain a copy of the secure message.

Figure 8:
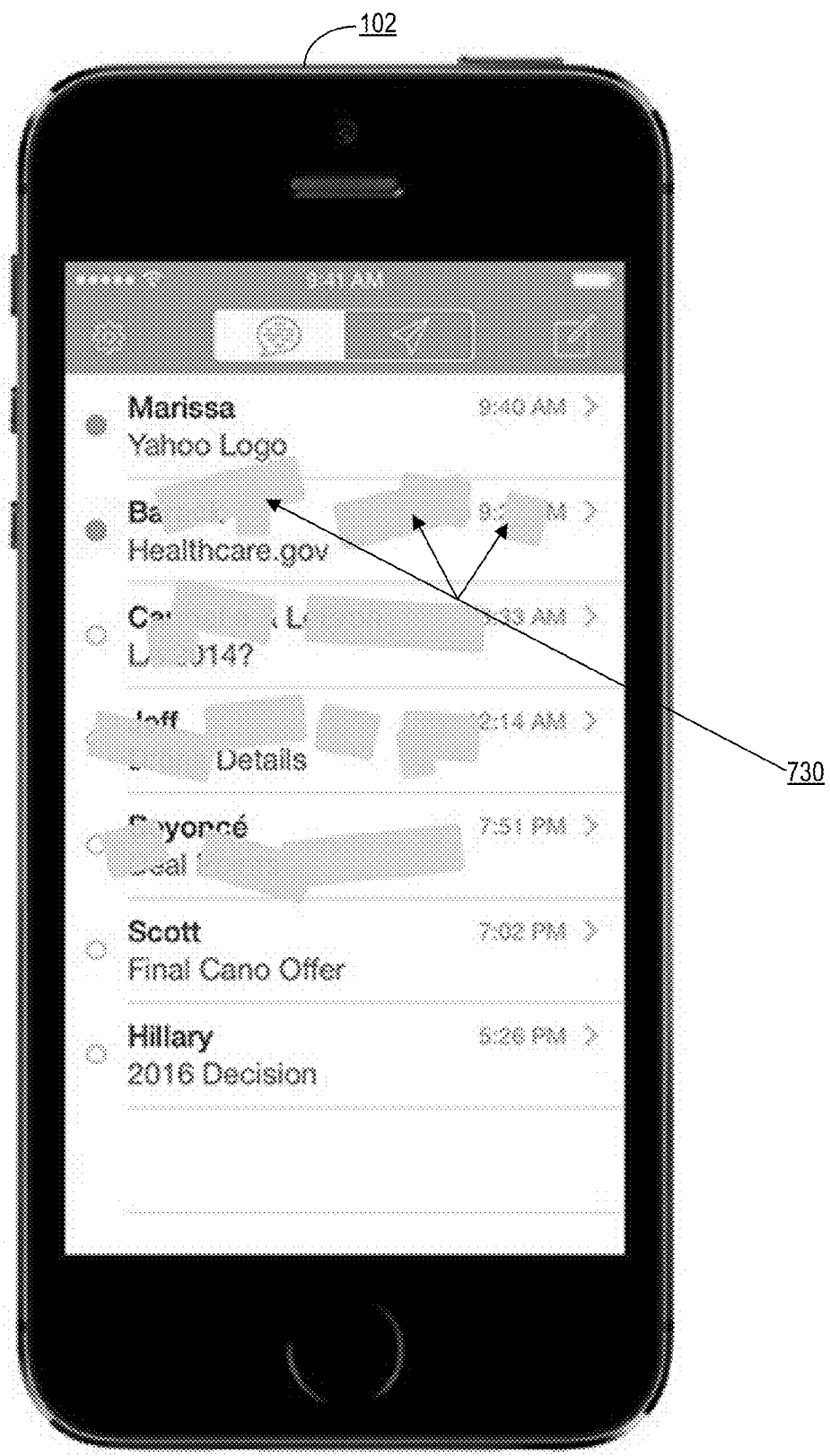
FIG. 8 depicts an exemplary interface reflecting various aspects described herein, in accordance with one implementation of the present disclosure.
Figure 9:
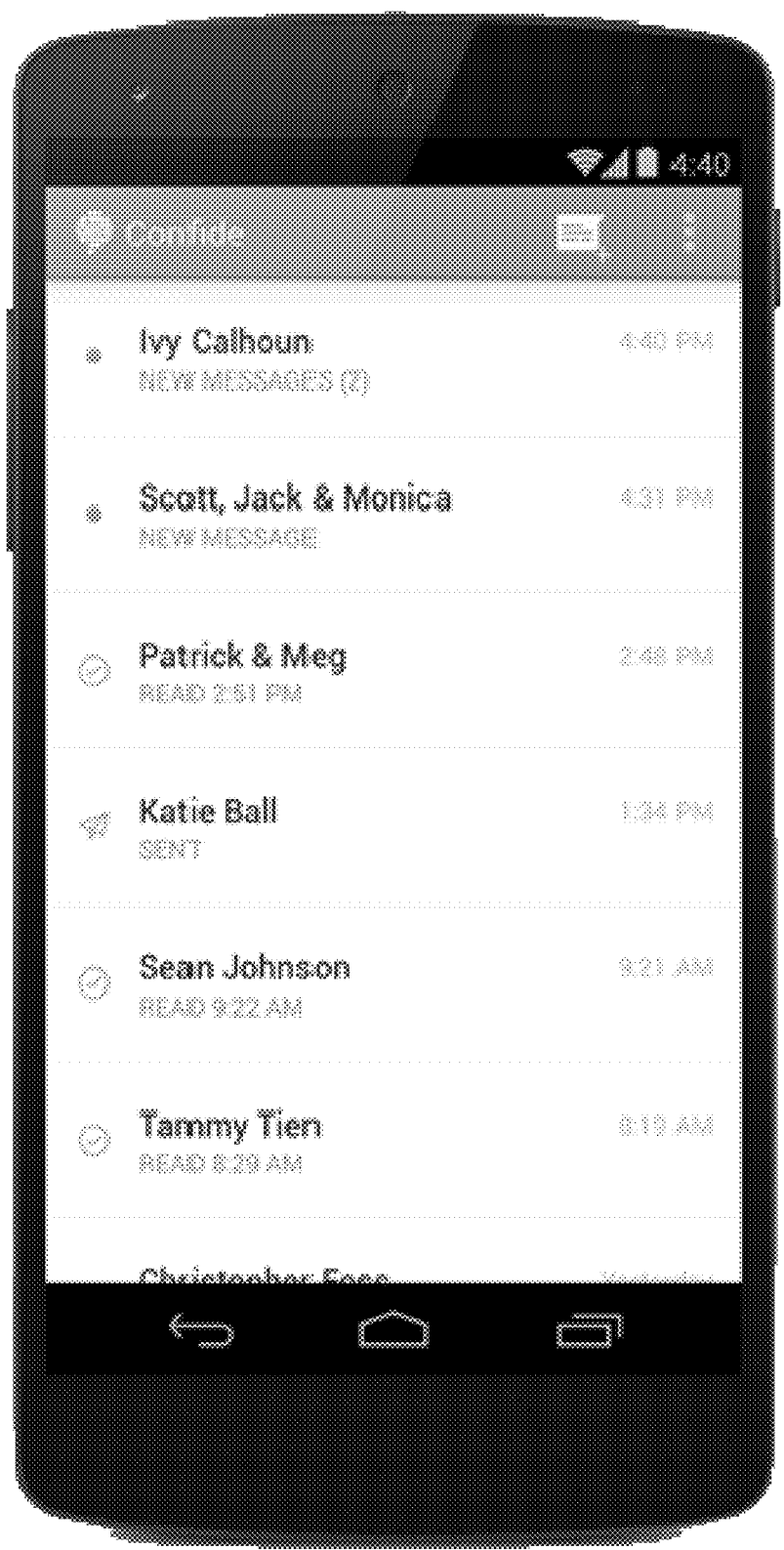
FIG. 9 depicts an exemplary interface reflecting various aspects described herein, in accordance with one implementation of the present disclosure.

It should also be understood that while, in various implementations, multiple received secure messages can be depicted/presented to a user in an ordered sequence/arrangement of messages (e.g., ordered chronologically based on the time that each message was received, such as is depicted in FIG. 8), in other implementations such messages can be presented/depicted with respect to the user/contact from which they originate. For example, as shown in FIG. 9, received secure message(s) can be depicted to a user in relation to the sender of such messages. Doing so can indicate to the receiver that one (or more) secure messages have been received from a particular sender, while also not providing further information (e.g., subject, etc.).

Additionally, in certain implementations the described technologies can further enable users that have sent secure messages to prompt/remind the intended receivers of such messages to read or otherwise view the sent secure message(s). Upon determining that the receiver has read/viewed the secure message (e.g., by providing/performing the authentication action with respect to part of and/or the entire message), a notification can be provided to the sender, reflecting that the message (and/or a part/segment thereof) has been viewed.

Additionally, it should be noted that while various aspects of the forgoing description and/or the accompanying figures may refer to and/or depict the technologies disclosed herein as an independent 'standalone' messaging/communications platform, in certain implementations the technologies described herein can also be implemented in conjunction with existing messaging/communications platforms, applications, clients etc. In doing so, a user (e.g., a sender, recipient, etc.) can utilize both the secure messaging functionality described herein, as well as the relatively less secure functionality provided by such existing communications technologies, within a single interface.

Additionally, while various examples described herein utilize or otherwise incorporate a central server/machine (e.g., for the purpose of receiving/transmitting secure messages/content), in other implementations such a server/machine may be configured such that it does not receive, store, or otherwise retain such messages/content. For example, in lieu of transmitting the content of a secure message itself, a notification can be provided (e.g., from a device corresponding to the user wishing to send a secure message) to the central server/machine, reflecting that the sender wishes/intends to send a secure message to an intended receiver. The central server/machine can then determine if/when a device associated with the intended receiver is available in a manner that will enable receipt of the secure message (e.g., is connected to the Internet, logged in to a secure messaging application, etc.). Upon determining that the device associated with the receiver is available, the central machine can provide a notification to the device associated with the sender, reflecting, for example, that the device of the intended receiver is available and instructing the sender device to transmit the secure message directly to the intended receiver. Alternatively, the central server/machine can coordinate/configure the transmission of the secure message from the sender to the intended receiver (e.g., via a secure communication channel). It should be appreciated that, in a scenario in which the intended receiver is not presently available (e.g., is not connected to the Internet, logged into a secure messaging application, etc.) at the time that the sender intends to transmit the message/content, such a message/content can be retained at the sender device (e.g., until the receiver device is determined to be available). In doing so, the central server/machine can coordinate/ensure the delivery of the secure message/content from the sender to the receiver while also not receiving/retaining the content of such message at any point in time.

Figure 6:
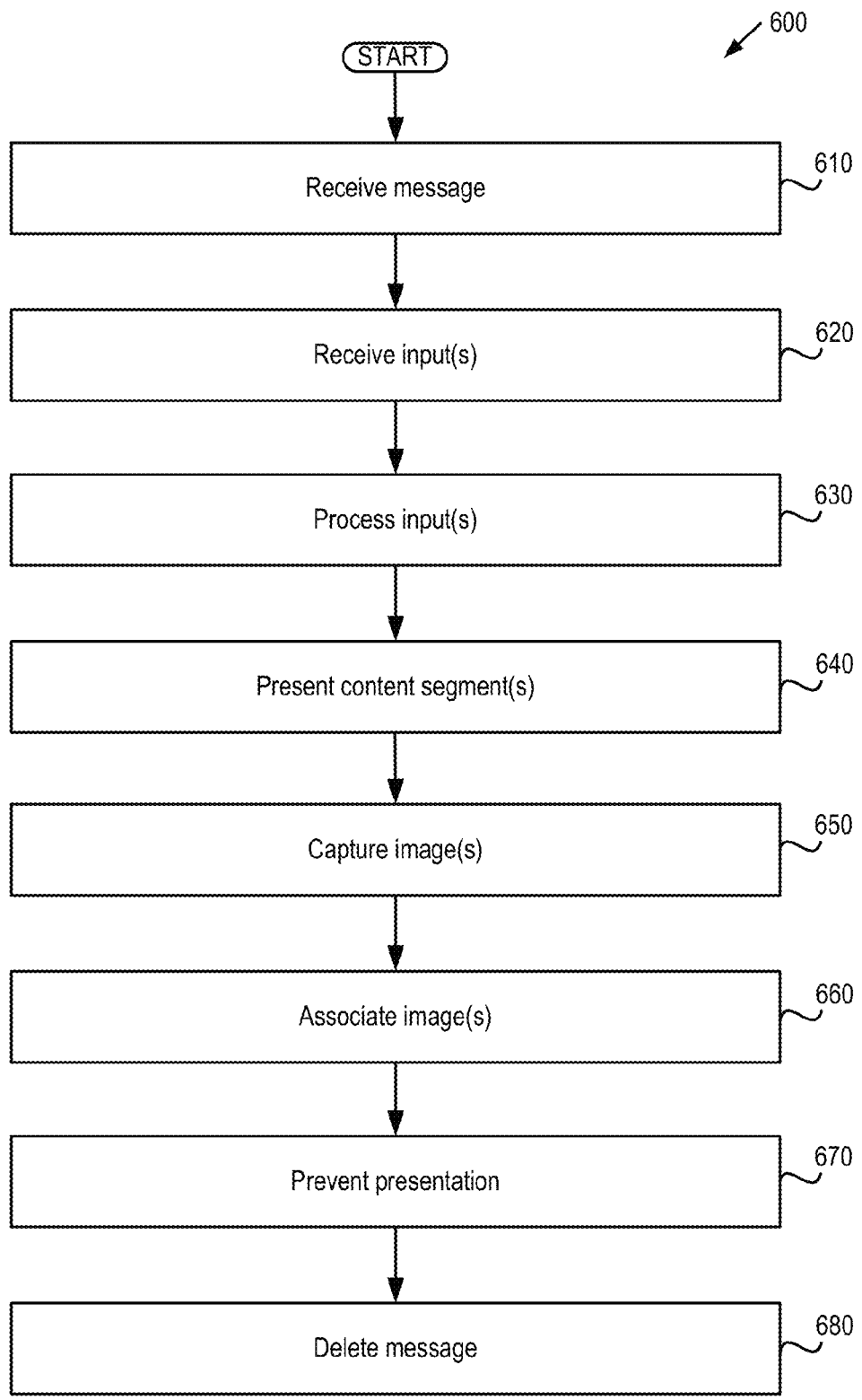
FIG. 6 depicts a flow diagram of aspects of a method for secure messaging and content sharing.

FIG. 6 depicts a flow diagram of aspects of a method 600 for providing secure messaging. The method is performed by processing logic that may comprise hardware (circuitry, dedicated logic, etc.), software (such as is run on a computing device such as those described herein), or a combination of both. In one implementation, the method is performed by user device 102 of FIG. 1, while in some other implementations one or more blocks of FIG. 6 may be performed by another machine. For example, in various alternative implementations, the method can be performed at server machine 120 (i.e., the method or various aspects thereof can be performed remotely at server machine 120 rather than at/in communication with a client device such as user device 102A).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 610, a message can be received. In certain implementations, such a message can include one or more content segments (e.g., words, clauses, etc.), such as is described herein. Moreover, in certain implementations the referenced message can include both secure content segments as well as unsecure content segments (e.g., content segments that do not require an authentication action to be performed in order to view them), such as is described herein. Additionally, in certain implementations, in lieu of receiving the message itself, a notification of a message can be received. For example, the receiver can receive a notification that a secure message has been composed (e.g., by the sender), and can be transmitted to the receiver (e.g., upon performance of an authentication action, such as is described herein). In one aspect, block 610 is performed by secure messaging engine 130 (e.g., executing on a user device 102).

At block 620, one or more inputs can be received. In certain implementations, such inputs can be received in relation to the one or more content segments (e.g., the content segments that make up a message, such as the message received at block 610). Examples of such inputs include, but are not limited to tactile inputs, such as may be received (e.g., via a touchscreen) in relation to a depiction of the referenced content segments. Moreover, as described herein, in certain implementations the referenced inputs can be received in relation to an indicator (e.g., authentication indicator 720 as depicted in FIG. 7) that corresponds to a depiction of the one or more content segments (e.g., as obscured by a corresponding concealed content indicator 730 as depicted in FIG. 7). In one aspect, block 620 is performed by secure messaging engine 130 (e.g., executing on a user device 102).

At block 630, the one or more inputs (such as those received at block 620) can be processed. In doing so, it can be determined that an authentication action is being performed, such as with respect to the at least one of the one or more content segments, such as in a manner described herein. In one aspect, block 630 is performed by secure messaging engine 130 (e.g., executing on a user device 102).

At block 640, one or more content segments can be presented. In certain implementations, such content segments can be presented based on a determination that the referenced authentication action is being/has been performed with respect to them. Moreover, as described herein, in certain implementations, a user may be required to reveal the content of a message in a particular sequence. For example, in order to reveal one content segment, it may be required to determine that an authentication action was performed with respect to one or more preceding content segments, in addition to determining whether the authentication action is being performed with respect the particular content segment. In one aspect, block 640 is performed by secure messaging engine 130 (e.g., executing on a user device 102).

Additionally, as described herein, in certain implementations, in lieu of receiving the message itself, a notification of a message can be received (e.g., in order to prevent transmission of secure content until an authentication action has been performed). Accordingly, in such a scenario, upon determining that the authentication action is being/has been performed (e.g., with respect to at least one of the content segments) a request for the at least one of the content segments can be transmitted (e.g., to a central server and/or to the sender) and/or the at least one of the content segments can be received (e.g., in response to the requesting).

At block 650, one or more images can be captured, such as in a manner described herein in relation to block 240. In certain implementations, such images can be captured based on a determination that the authentication action is being performed (e.g., at block 630). In one aspect, block 650 is performed by secure messaging engine 130 (e.g., executing on a user device 102).

At block 660, the one or more images (such as those captured at block 650) can be associated, such as with one or more content segments, such as those content segments in relation to which they were captured. In doing so, a record can be maintained with respect to the identity of the user that performed the authentication action and/or the circumstances under which such an action was performed (e.g., with respect to a particular message/content segment). In one aspect, block 660 is performed by secure messaging engine 130 (e.g., executing on a user device 102).

At block 670, presentation of the one or more content segments can be precluded and/or prevented, such as is described in relation to block 250. In certain implementations, such presentation can be prevented based on a determination that the authentication action is not and/or is no longer being performed with respect to the one or more content segments. In one aspect, block 670 is performed by secure messaging engine 130 (e.g., executing on a user device 102).

At block 680, the message (e.g., the message received at block 610) can be deleted. In certain implementations, such a message can be deleted based on a determination that an authentication action has been performed with respect to each of the content segments that make up the message, such as is described herein. In one aspect, block 680 is performed by secure messaging engine 130 (e.g., executing on a user device 102).

Figure 13:
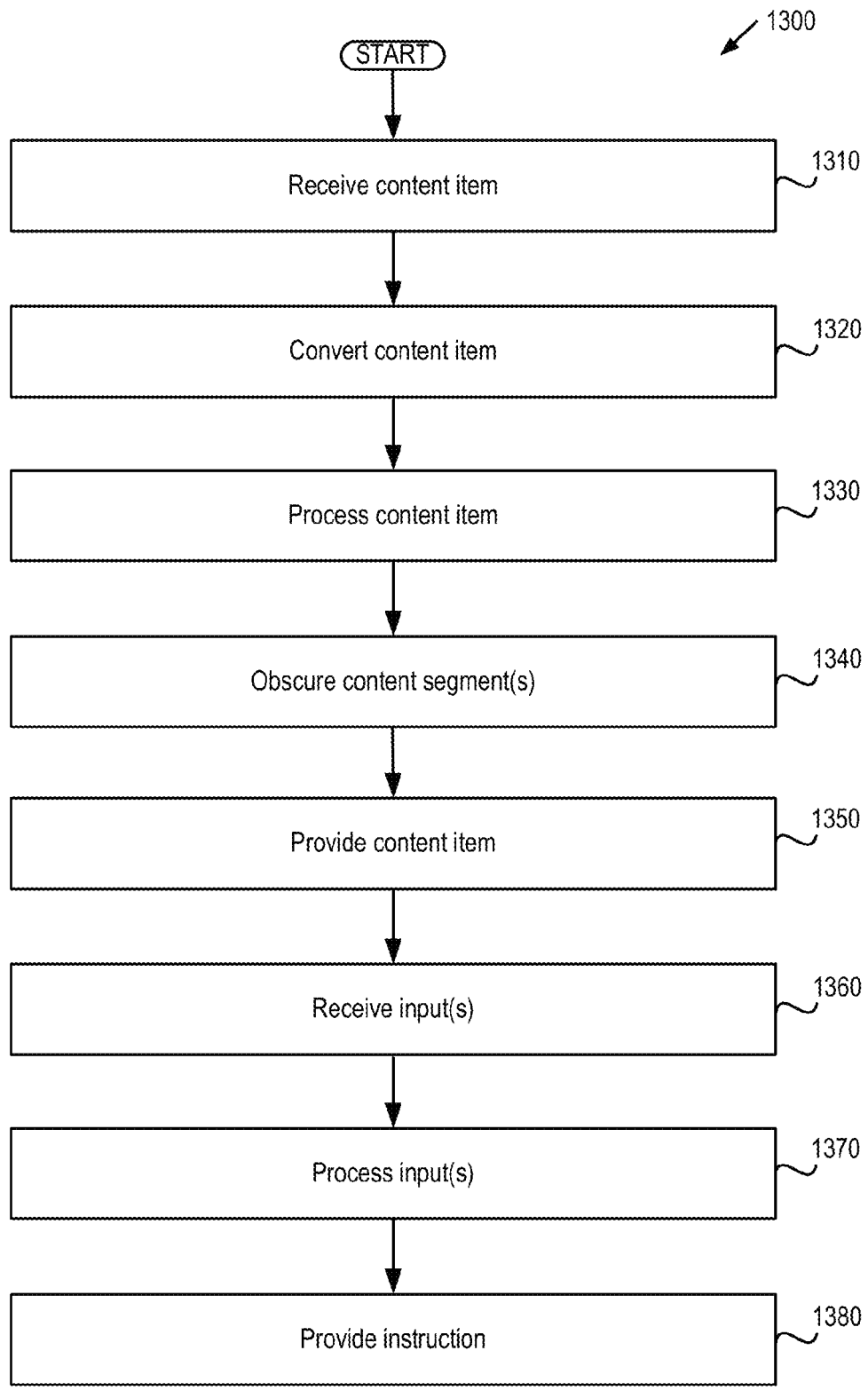
FIG. 13 depicts a flow diagram of aspects of a method for secure messaging and content sharing.

FIG. 13 depicts a flow diagram of aspects of a method 1300 for providing secure messaging. The method is performed by processing logic that may comprise hardware (circuitry, dedicated logic, etc.), software (such as is run on a computing device such as those described herein), or a combination of both. In one implementation, the method is performed by server machine 120 of FIG. 1, while in some other implementations one or more blocks of FIG. 13 may be performed by another machine. For example, in various alternative implementations, the method can be performed at user device 102 (i.e., the method or various aspects thereof can be performed locally at user device 102 rather than at/in communication with a central server such as server machine 120).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 1310, a content item can be received, e.g., in a first format (e.g., a text format, PDF format, etc.), such as in a manner described herein. In certain implementations the content item can be associated with an intended recipient, as described herein. In one aspect, block 1310 is performed by secure messaging engine 130 (e.g., executing on a server machine 120).

At block 1320, the content item (e.g., as received at 1310) can be converted into a second format (e.g., into an image format, e.g., JPEG, etc.,), such as in a manner described herein. In one aspect, block 1320 is performed by secure messaging engine 130 (e.g., executing on a server machine 120).

At block 1330, the content item (e.g., as received at 1310 and/or converted at 1320) can be processed. In doing so, one or more sensitive content segments (e.g., personal information, financial terms, etc.) can be identified within the content item, such as in a manner described herein. In one aspect, block 1330 is performed by secure messaging engine 130 (e.g., executing on a server machine 120).

At block 1340, one or more sensitive content segments (such as those identified at 1330) can be obscured, such as in a manner described herein. In one aspect, block 1340 is performed by secure messaging engine 130 (e.g., executing on a server machine 120).

At block 1350, the content item, as converted into the second format, can be provided (e.g., as described herein). In certain implementations, such a content item can be provided to a device associated with the intended recipient. Moreover, in certain implementations the content item as converted into the second format and having the one or more sensitive content segments obscured, can be provided, e.g., to a device associated with the intended recipient. In one aspect, block 1350 is performed by secure messaging engine 130 (e.g., executing on a server machine 120).

At block 1360, one or more inputs can be received. In certain implementations, such inputs can be received from the device associated with the intended recipient. Moreover, in certain implementations such inputs can be received in relation to a segment of the content item, such as is described herein. Moreover, in certain implementations such inputs can be received from a device associated with the intended recipient. Additionally, in certain implementations such inputs can be received in relation to at least one of the one or more sensitive content segments, as obscured (e.g., at 1340). In one aspect, block 1360 is performed by secure messaging engine 130 (e.g., executing on a server machine 120).

At block 1370, the one or more inputs (e.g., those received at 1360) can be processed. In doing so, it can be determined that an authentication action (such as is described herein) is being performed with respect to a particular segment (or segments) of the content item (e.g., in relation to the obscured region that corresponds to such a segment, such as is described and referenced herein). Moreover, in certain implementations the referenced authentication action can include a tactile input received in relation to at least one content segment of the content item. In one aspect, block 1370 is performed by secure messaging engine 130 (e.g., executing on a server machine 120).

At block 1380, an instruction to present the segment of the content item at the device associated with the intended recipient can be provided, such as is described herein. In certain implementations, an instruction to present, at the device associated with the intended recipient, the at the at least one of the one or more sensitive content segments, based on a determination that the authentication action is being performed with respect to the segment of the content item, such as is described herein. In one aspect, block 1380 is performed by secure messaging engine 130 (e.g., executing on a server machine 120).

By way of further illustration, in certain implementations various content items, types, formats, etc. can be processed/preprocessed and/or converted in conjunction with their inclusion/incorporation into a secured message. For example, in certain implementations, in order to attach, embed, or otherwise incorporate various content types (e.g., text documents, spreadsheets, presentations, PDF files, etc.), the content selected for inclusion can be converted into another format (e.g., an image format such as JPEG, PNG, etc.). In lieu of attaching/providing the selected content itself (e.g., a Word document, a spreadsheet, a presentation file, etc.), the content can be converted into an image file that visually depicts the content as presented in the originally selected file, and this image file can be provided/transmitted as a secure communication (and subsequently revealed by a recipient via an authentication action, such as in a manner described herein). In doing so, the ability of the recipient to capture content included in the originally selected file (e.g., via copy/paste techniques, etc.) can be significantly reduced. It should also be noted that, in certain implementations, the described processing/conversion can be performed at the sender's device, thereby ensuring the security of the message/transmission. In other implementations the referenced processing/conversion can be performed at server machine 120 (e.g., by/in conjunction with secure messaging engine 130).

Moreover, while in certain implementations the entire body of received content (e.g., the entire message, image, etc.) may be initially obscured, in other implementations only a portion/segment of the message/content may be obscured (e.g., only that content that is sensitive/confidential). In certain implementations, the sender may have the ability to define which areas/segments are to be obscured. In other implementations, the message/content can be processed in order to identify those areas that may be more likely to be sensitive (and thus may be more important to secure). For example, text content can be processed/scanned to identify (and obscure) proper names, addresses, dollar amounts, and/or any other such sensitive information. By way of further example, images can be processed to identify (and obscure) human faces and/or text content.

It should also be noted that, in certain implementations, the sender may be capable of recalling a secured message. For example, after sending a message (such as in a manner described herein), the sender can subsequently elect to recall the message, and such a recalled message can be deleted from the device(s) of the recipients of the message. Moreover, in certain implementations a sender can revoke or change one or more security aspects of a message. For example, after transmitting a secure message, the sender can later elect to change a security aspect of the message (e.g., indicating that such a message no longer needs to be secure, thereby enabling recipients of the message to view it without performing an authentication action).

It should also be noted that while the technologies described herein are illustrated primarily with respect to secure messaging, the described technologies can also be implemented in any number of additional or alternative settings or contexts and towards any number of additional objectives. It should also be understood that further technical advantages, solutions, and/or improvements (beyond those described and/or referenced herein) may be enabled as a result of such implementations. For example, as noted, the described technologies can also be employed with respect to content sharing/delivery. For example, the described technologies can be configured to enable users to transmit content (e.g., documents, media, files, etc.) in a manner that enables such content (and/or a portion/segment thereof) to be viewed (e.g., based on/in response to a determination that an authentication action is being provided), while also preventing such content from being retained or otherwise memorialized after it has been viewed.

Figure 10:
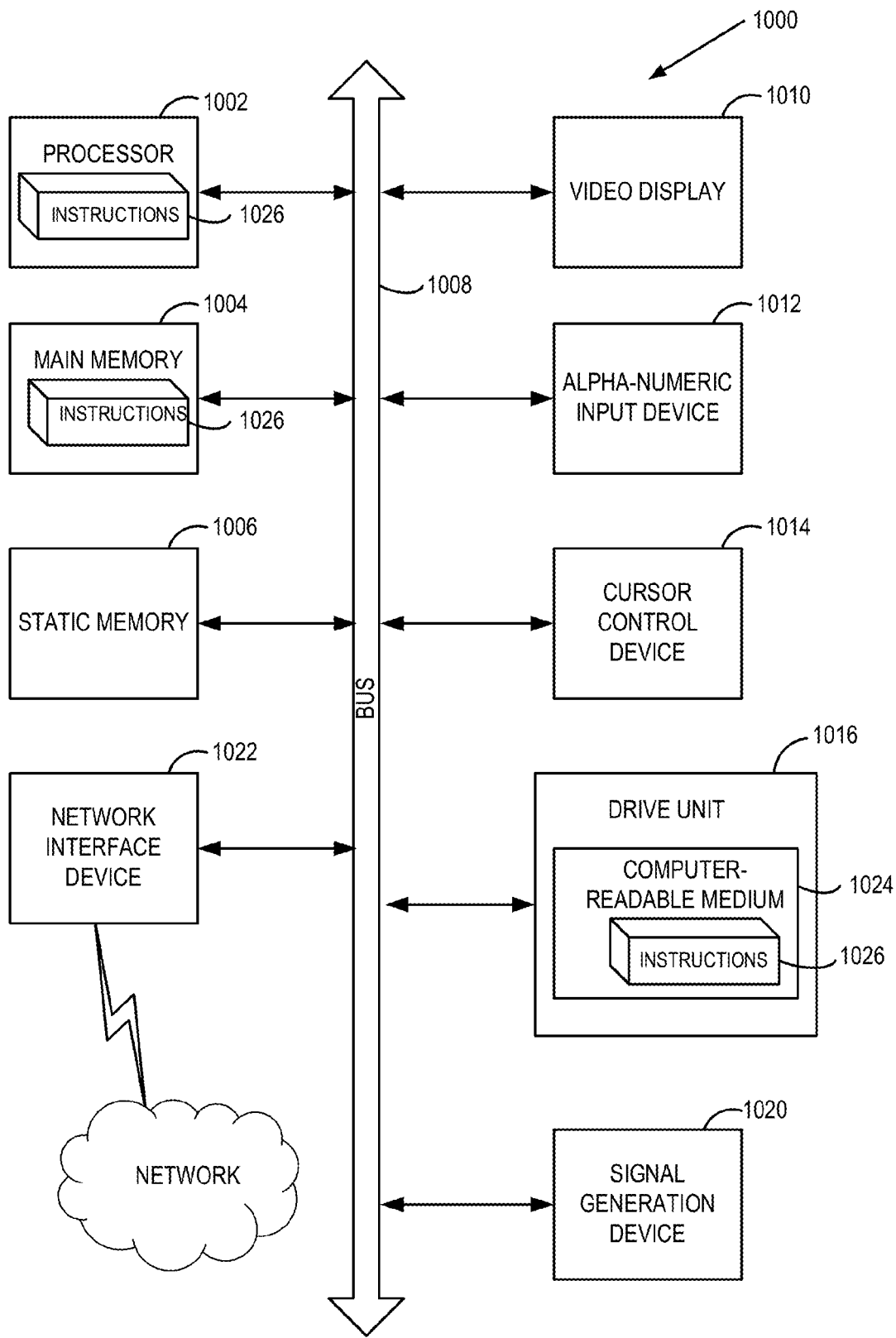
FIG. 10 depicts a block diagram of an illustrative computer system operating in accordance with aspects and implementations of the present disclosure.

FIG. 10 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing system (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1008.

Processor 1002 represents one or more processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1016 may include a computer-readable medium 1024 on which is stored one or more sets of instructions 1026 embodying any one or more of the methodologies or functions described herein. Instructions 1026 may also reside, completely or at least partially, within the main memory 1004 and/or within the processor 1002 during execution thereof by the computer system 1000, the main memory 1004 and the processor 1002 also constituting computer-readable media. Instructions 1026 may further be transmitted or received over a network via the network interface device 1022.

While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "providing," "precluding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a computing device selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It should be understood that the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to practically any type of data. The scope of the disclosure should, therefore, be determined with reference to the appended claims, along with the full scope of equivalents to which such claims are entitled.

What is claimed is:

1. A method comprising:
receiving, by a processing device, a content item associated with an intended recipient;
receiving, by the processing device, from a device associated with the intended recipient, one or more inputs in relation to the content item;
processing, by the processing device, the one or more inputs to determine whether an authentication action is being performed with respect to a segment of the content item;
in response to determining that the authentication action is being performed with respect to the segment of the content item, providing, by the processing device, a first instruction to present the segment of the content item at the device associated with the intended recipient;
configuring the device to capture an image of a display screen of the device while the intended recipient is provided with access to the segment of the content item on the display screen of the device;
associating the captured image with the segment of the content item;
determining an identity of the intended recipient of the device based on the captured image; and
in response to determining that the authentication action is not being performed with respect to the segment of the content item, providing by the processing device, a second instruction to not present the segment of the content item at the device associated with the intended recipient.

2. The method of claim 1, further comprising processing the content item to identify one or more sensitive content segments within the content item.

3. The method of claim 2, further comprising obscuring the one or more sensitive content segments.

4. The method of claim 3, further comprising providing the content item having the one or more sensitive content segments obscured, to a device associated with the intended recipient.

5. The method of claim 4, further comprising receiving one or more inputs, from the device associated with the intended recipient, in relation to at least one of the one or more sensitive content segments, as obscured.

6. The method of claim 5, further comprising providing an instruction to present the at least one of the one or more sensitive content segments at the device associated with the intended recipient.

7. The method of claim 1, wherein the authentication action comprises a tactile input received in relation to at least one of a first segment or a second segment of the segment of content item.

8. A system comprising:
a memory; and
a processing device, operatively coupled to the memory, to:
receive a content item, the content item being associated with an intended recipient;
receive, from a device associated with the intended recipient, one or more inputs in relation to a segment of the content item;
process the one or more inputs to determine that an authentication action is being performed with respect to a first segment of the content item;
configure the device to capture an image of a display screen of the device while the intended recipient is provided with access to the segment of the content item on the display screen of the device;
associate the captured image with the segment of the content item;
determine an identity of the intended recipient of the device based on the captured image; and
in response to determining that the authentication action is being performed with respect to the segment of the content item, provide a first instruction to present the segment of the content item at the device associated with the intended recipient; and
in response to determining that the authentication action is not being performed with respect to the segment of the content item, provide a second instruction to not present the segment of the content item at the device associated with the intended recipient.

9. The system of claim 8, wherein the processing device is further to process the content item to identify one or more sensitive content segments within the content item.

10. The system of claim 9, wherein the processing device is further to obscure the one or more sensitive content segments.

11. The system of claim 10, wherein the processing device is further to provide the content item having the one or more sensitive content segments obscured, to a device associated with the intended recipient.

12. The system of claim 11, wherein the processing device is further to receive one or more inputs, from the device associated with the intended recipient, in relation to at least one of the one or more sensitive content segments, as obscured.

13. The system of claim 12, wherein the processing device is further to provide an instruction to present the at least one of the one or more sensitive content segments at the device associated with the intended recipient.

14. The system of claim 8, wherein the authentication action comprises a tactile input received in relation to at least one of a first segment or a second segment of the segment of content item.

15. A non-transitory computer readable medium having instructions stored thereon that, when executed by a processing device, cause the processing device to:
receive a content item, the content item being associated with an intended recipient;
receive, from a device associated with the intended recipient, one or more inputs in relation to a segment of the content item;
process the one or more inputs to determine that an authentication action is being performed with respect to a segment of the content item;
in response to determining that the authentication action is being performed with respect to the segment of the content item, provide a first instruction to present the segment of the content item at the device associated with the intended recipient;
configure the device to capture an image of a display screen of the device while the intended recipient is provided with access to the segment of the content item on the display screen of the device;
associate the captured image with the segment of the content item;
determine an identity of the intended recipient of the device based on the captured image; and in response to determining that the authentication action is not being performed with respect to the segment of the content item, provide a second instruction to not present the segment of the content item at the device associated with the intended recipient.

16. The non-transitory computer readable medium of claim 15, wherein the processing device is further to process the content item to identify one or more sensitive content segments within the content item.

17. The non-transitory computer readable medium of claim 16, wherein the processing device is further to obscure the one or more sensitive content segments.

18. The non-transitory computer readable medium of claim 17, wherein the processing device is further to provide the content item having the one or more sensitive content segments obscured, to a device associated with the intended recipient.

19. The non-transitory computer readable medium of claim 18, wherein the processing device is further to receive one or more inputs, from the device associated with the intended recipient, in relation to at least one of the one or more sensitive content segments, as obscured.

20. The non-transitory computer readable medium of claim 19, wherein the processing device is further to provide an instruction to present the at least one of the one or more sensitive content segments at the device associated with the intended recipient.

* * * * *